(No Model.)
S. W. WOODBURY.
FEEDING ATTACHMENT FOR CARDING MACHINES.
No. 587,629. Patented Aug. 3, 1897.
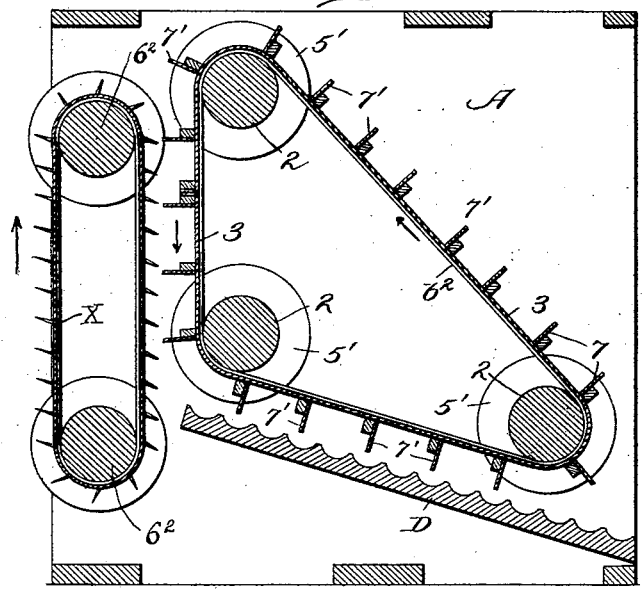
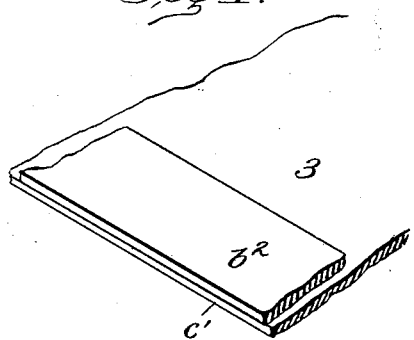
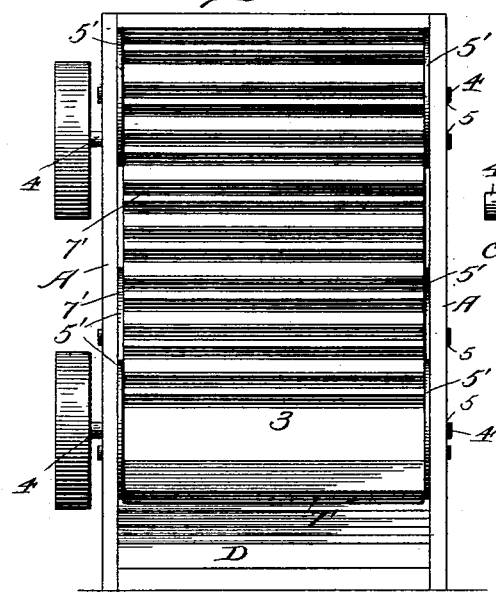
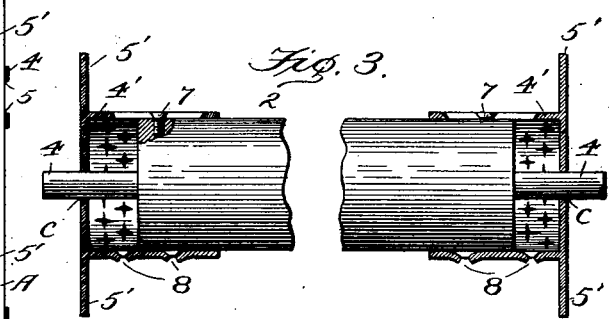
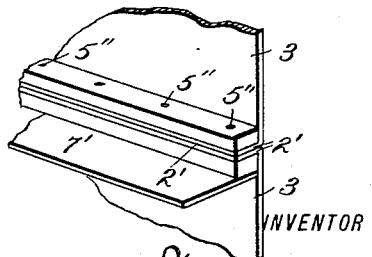
WITNESSES:
Edwin L. Bradford
E. Wade Ball
INVENTOR
Stephen W. Woodbury
BY
R. S. & A. S. Lacey
ATTORNEY.
THE NORRIS PETERS CO., PHOTO-LITHO., WASHINGTON, D. C.

UNITED STATES PATENT OFFICE.

STEPHEN W. WOODBURY, OF WINCHESTER, NEW HAMPSHIRE.

FEEDING ATTACHMENT FOR CARDING-MACHINES.

SPECIFICATION forming part of Letters Patent No. 587,629, dated August 3, 1897.

Application filed July 20, 1896. Serial No. 599,926. (No model.)

*To all whom it may concern:*

Be it known that I, STEPHEN W. WOODBURY, of Winchester, in the county of Cheshire and State of New Hampshire, have invented an Improved Attachment for Feeding Carding-Machines, of which the following is a specification.

This invention relates to the feeding and delivery to carding-machines and other preparing machinery of wool, cotton, and fibrous material in general.

My said invention includes an endless toothed elevating-apron $x$ to take the wool or other material from a mass in the feed-box, which is situated in any suitable and convenient place and is operated by the rollers $6^2$. The wool taken up by the said toothed elevator-apron is acted upon by the endless stripper-apron.

A further object of the invention consists of a provision of a series of rollers for the stripper-apron of a peculiar and novel construction, which will be fully described hereinafter, and various other novel features in regard to the construction of the endless stripper-apron, such as will be described farther on.

With these objects in view the invention consists of the details of construction and arrangement which will more fully appear hereinafter.

In the accompanying drawings, which form a part of this application, Figure 1 is a longitudinal sectional view. Fig. 2 is a front elevation. Fig. 3 is a detail of one of the rollers. Fig. 4 is a view of the stripper-apron, showing the reinforced edges. Fig. 5 is a detail of the ends of the stripper-apron, showing the manner of joining the same.

Like numerals and letters of reference indicate corresponding parts in the several views.

Referring to the drawings, a framework A of suitable shape is provided to sustain the working parts. A series of three rollers 2 are journaled in the sides of the said frame A and have the endless stripper-apron 3 working therearound. The said rollers are of a novel and peculiar construction and is one of the principal features of my invention. On each side of the rollers 2 are attached trunnions 4, which work in bearings 5, which are situated in the sides of the frame A. One or more of the said trunnions may extend through the sides of the said framework and may have keyed thereto band-wheels for operating the said apron. On each end of the said rollers 2 are placed attachments which are used to lengthen or shorten the said rollers when desired and also to prevent the wool or other material from getting under the apron, as it is apt to do in the old style. The said attachment consists of a cylindrical cap 4', fitting over the ends of the said rollers 2, and at the outer ends of the said caps are secured disks 5', centrally apertured at $c$, so as to allow the said trunnions to pass through.

Set-screws 7 are provided, as shown, for keeping the caps rigid after the proper adjustment is made. The outer surfaces of the cylindrical cap and the said rollers have raised perforations 8, which are very useful in preventing the stripper-apron 3 from slipping when the said rollers are suddenly started. The stripper-apron 3 has a smooth glazed surface, which is very useful in preventing the wool from sticking to the said apron. Another improved feature in the construction of my stripper-apron is the manner of joining the ends together, making the said apron endless. In the old style the ends are usually glued or riveted, thus preventing the said apron from being taken out without withdrawing the rollers.

In the present invention the ends 2' are placed together and strips of wood are placed on the outer sides of the said ends, and then screws 5'', which can be readily removed, are screwed through the said ends and the said strips. The said ends and strips also form one of the carriers 7', which are placed transverse of the said stripper-apron. The outer edges $c'$ of the said stripper-apron adjacent to the sides of the frame A are reinforced by an extra strip of leather $b^2$, which prevents the said edges from turning up when they come in contact with the sides of the frame A. Carriers 7' are placed across transversely of the stripper-apron.

The ordinary beater-board D is employed, as in other machines of this class, to assist in removing dust and dirt from the fiber as it is combed across its face by the stripper-apron.

Having thus described my invention, what

I claim as new, and desire to secure by Letters Patent, is—

In the herein-described device, the combination of a series of rollers arranged as shown, said rollers having trunnions working in bearings situated in frame, A, frame A adapted for holding the operating mechanism, cylindrical caps situated on each side of said rollers and having raised perforations on the outer surface thereof to prevent the apron 3 from slipping, the apron 3, working over the rollers 2, set-screws for rigidly securing the said caps to the said rollers, disks rigidly secured to the outer ends of the said caps, substantially as set forth and described.

In testimony whereof I affix my signature in the presence of two witnesses.

STEPHEN W. WOODBURY.

Witnesses:
 GEO. W. BROWN,
 EDWARD A. PICKERING.